United States Patent
Akaishi

(10) Patent No.: US 6,642,164 B2
(45) Date of Patent: Nov. 4, 2003

(54) LIGHTWEIGHT HEAT-INSULATING BUILDING MATERIAL HAVING FROST RESISTANCE

(75) Inventor: Noriyasu Akaishi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 16 days.

(21) Appl. No.: 09/989,391

(22) Filed: Nov. 21, 2001

(65) Prior Publication Data

US 2002/0142911 A1 Oct. 3, 2002

(30) Foreign Application Priority Data

Dec. 8, 2000 (JP) .......................................... 2000-374671

(51) Int. Cl.[7] ............................................... C04B 38/00
(52) U.S. Cl. .............................. 501/80; 501/84; 252/62
(58) Field of Search ......................... 501/80, 84; 252/62

(56) References Cited

U.S. PATENT DOCUMENTS

| | | | |
|---|---|---|---|
| 1,795,200 A | | 3/1931 | Grossley |
| 4,178,163 A | * | 12/1979 | Wilstefeld ..................... 65/22 |
| 4,798,758 A | * | 1/1989 | Nagano et al. .............. 428/213 |
| 4,879,159 A | * | 11/1989 | Furuuchi ..................... 428/161 |
| 6,478,993 B2 | * | 11/2002 | Gontmakher et al. ......... 264/42 |

FOREIGN PATENT DOCUMENTS

| | | |
|---|---|---|
| GB | 1 299 014 | 12/1972 |
| GB | 2 052 475 | 1/1981 |
| JP | 61-2618 | 1/1986 |
| JP | 6-99160 | 12/1994 |
| JP | 11-79866 | 3/1999 |
| WO | 00/61512 | 10/2000 |

* cited by examiner

*Primary Examiner*—Paul Marcantoni
(74) *Attorney, Agent, or Firm*—Kanesaka & Takeuchi

(57) ABSTRACT

A lightweight heat-insulating building material which has excellent frost resistance and a low price is provided. The lightweight heat-insulating building material having frost resistance is produced by molding a mixture of raw materials containing glass powder, a foaming agent, a crystallization inhibitor, and a frost inhibitor so as to form a molded body, and firing the molded body so as to foam the molded body.

9 Claims, No Drawings

LIGHTWEIGHT HEAT-INSULATING BUILDING MATERIAL HAVING FROST RESISTANCE

FIELD OF THE INVENTION

The present invention relates to a lightweight heat-insulating building material having frost resistance.

BACKGROUND OF THE INVENTION

Foamed glass is used as interior materials, exterior materials, and walls of housings and buildings due to its heat insulation and sound absorbing properties.

The following Japanese patent publications describe foamed glass.

(i) JP S61-2618B discloses foamed glass which has bulk density of 0.20–0.34 g/cm$^3$ and which is produced by adding 1.5–9.5% by weight dolomite ($MgCO_3.CaCO_3$) powder as a foaming agent into glass powder of soda-lime glass or the like so as to form a mixture, and heating the mixture at 700–780° C. at least for one hour.

(ii) JP H06-99160B discloses laminated foamed glass consisting of a foamed glass layer having bulk density of 0.3–0.6, a medium-foamed glass layer (bulk density 1.0–1.7), and a non-foamed glass layer. Raw materials for the respective layers are successively molded to be laminated integrally and fired under pressure, thereby producing the laminated foamed glass.

(iii) JP H11-79866A discloses foamed glass which is produced by coating foamed glass beads with coating material comprising clay and glass, dry-pressing the coated beads, and firing the dry-pressed body at 800–1100° C.

The foamed glass of the above (i) and the laminated foamed glass of the above (ii) have poor frost resistance because they have high water absorption. The foamed glass of (i), (ii) has thin cell walls and boundary faces between glass phases and crystal phases, and the thin cell walls and the boundary faces can be dissolved by water so as to form pores through which the water can easily enter into the glass. The foamed glass of (i), (ii) has small pores which are already formed in glass at cell walls during firing. In the early stage of water absorption, the glass seems to have low water absorption in appearance due to insufficient replacement between gas or air in the cells and water. However, the glass absorbs a large amount of water finally to have high water absorption. Although the foamed glass has relatively low water absorption of 5–15% by weight in the normal condition, the foamed glass has significantly high water absorption of 50–100% by weight when boiled or soaked for a long period of time. Therefore, the foamed glass is easy to be damaged or broken due to repetitions of freezing and thawing of absorbed water.

The foamed glass of the above (iii) is produced with a large amount of the coating material which is 30–80 wt. % relative to the foamed glass beads. The foamed glass of (iii) is produced through many steps including of producing the foamed glass beads, molding them, and firing them at a high temperature of 800–1100° C., so that the foamed glass has a high manufacturing cost.

OBJECT AND SUMMARY OF THE INVENTION

It is an object of the present invention to provide a lightweight heat-insulating building material having frost resistance which has excellent frost resistance and can be manufactured at low cost.

The building material of the present invention is produced by molding a mixture of raw materials containing glass powder, a foaming agent, a crystallization inhibitor, and a frost inhibitor so as to form a molded body, and firing the molded body so as to foam the molded body.

The building material of the present invention has excellent frost resistance, lightweight, and heat insulation property.

DETAILED DESCRIPTION OF THE PREFERRED EMBODIMENTS

The lightweight heat-insulating building material having frost resistance according to the present invention is produced by mixing raw materials including glass powder, a foaming agent, a crystallization inhibitor, and a frost inhibitor, molding the mixture, and firing the molded body to foam the molded body.

Raw material for the glass powder may be soda-lime glass used for glass plates and glass bottles. Examples of the raw material include glass cullet obtained by grinding waste glass such as scraps of glass plates or glass bottles from plants for manufacturing glass plates and plants for processing glass, and construction and demolition waste glass.

The foaming agent can be at least one selected from the group consisting of carbonate and aluminium metal. The carbonate includes dolomite and calcium carbonate. The calcium carbonate may be limestone.

When the foaming agent is composed of carbonate only, the mixture of raw materials contains carbonate preferably in an amount of 0.3 to 10% by weight, more preferably 0.5 to 6% by weight.

When the foaming agent is composed of aluminium metal only, the mixture of raw materials contains aluminium metal preferably in an amount of 0.1 to 5% by weight, more preferably 0.3 to 1.5% by weight.

When the foaming agent is composed of carbonate and aluminium metal, the mixture of raw materials contains carbonate preferably in an amount of 0.5 to 5% by weight and aluminium metal preferably in an amount of 0.3 to 1.0% by weight. Carbonate and aluminium metal are present in the mixture preferably in an amount of 1.0 to 5% by weight in total, more preferably 2 to 4% by weight in total.

If the proportion of carbonate exceeds the aforementioned range, calcium oxide (CaO) and/or magnesium oxide (MgO) as decomposition products of the carbonate may crystallize the glass so as to increase the softening point of the glass. The increase in the softening point suppresses the glass to foam whereby decreasing the bulk density of obtained foamed glass. If the proportion of carbonate is lower than the aforementioned range, the amount of carbonic acid gas generated from the carbonate should be insufficient to foam the glass whereby decreasing the bulk density of obtained foamed glass. If the proportion of aluminium metal exceeds the aforementioned range, the foamed glass has continuous cells due to excessive foaming so as to unduly increase the water absorption, leading to poor frost resistance. On the other hand, if the proportion of aluminium metal is lower than the aforementioned range, the glass foams insufficiently so as to reduce the bubble ratio and the bulk density of the foamed glass.

When the foaming agent is composed of aluminium metal only, the foamed glass appears to be black colored that may sometimes spoil the appearance of the foamed glass. When the foaming agent is composed of aluminium metal and carbonate, the foamed glass appears to be light color that may be good in appearance.

The crystallization inhibitor can be at least one selected from the group consisting of water glass, sodium silicate, boric acid, borax, and Glauber's salt ($Na_2SO_4 \cdot 10H_2O$). The mixture of raw materials contains the crystallization inhibitor preferably in an amount of 1 to 10% by weight, more preferably 3 to 7% by weight expressed as sodium silicate. The crystallization inhibitor lower than this range of proportion allows glass to be easily crystallized, thus suppressing the glass to foam. The crystallization inhibitor exceeding this range of proportion unduly lowers the softening point of glass so as to allow the glass to foam excessively, whereby the foamed glass has poor strength and poor frost resistance.

The frost inhibitor is preferably material of calcium silicate series and may be at least one selected from the group consisting of lightweight aerated concrete, mortar, concrete, cement, calcium silicate plate, asbestos cement plate, wollastonite, and asbestos. The frost inhibitor may be construction and demolition waste of calcium silicate series.

The mixture of raw materials contains the frost inhibitor preferably in an amount of 0.5 to 30% by weight, more preferably 3 to 12% by weight.

The frost inhibitor lower than this range of proportion insufficiently prevents the frost damage. The frost inhibitor exceeding this range of proportion allows the glass to be crystallized so as to increase the softening point of the glass, thus suppressing the glass to foam. Foamed glass containing excess amount of frost inhibitor suffers easily frost damage because water is absorbed via the frost inhibitor.

The mixture of raw materials may contain dirt such as soil, wood, paper, plastic, and metal earned from the construction and demolition waste in an amount of 10% or less by weight.

The foamed glass as the lightweight heat-insulating building material having frost resistance according to the present invention is manufactured as follows.

First, the glass cullet, the foaming agent, and the crystallization inhibiter are milled and mixed by a mill to produce a powder mixture A. The mill may be a ball mill or a vibrating mill. After milled, the powder mixture A for the lightweight heat-insulating building material having frost resistance preferably has grain sizes of 87 $\mu$m or less, more preferably 43 $\mu$m or less and, in addition, it is desirable that the powder of which grain size is 10 $\mu$m or less accounts for 30 percent or more. The powder mixture A having such grain sizes is easy to disperse. A foamed glass produced by using this powder mixture has closed cells and thus has low water absorption. The powder mixture of which grain size exceeds the aforementioned range easily makes continuous cells in the foamed glass.

Separately from the aforementioned milling process, the frost inhibitor is milled to be powder. The powdered frost inhibitor and the powder mixture A are mixed. The powdered frost inhibitor may have grain size slightly coarser than the powder of the mixture A. The powder of the powdered frost inhibitor preferably includes particles having grain size from 10 to 43 $\mu$m in an amount of 50 percent or more.

The reason of milling the frost inhibitor separately from the glass cullet, the foaming agent, and the crystallization inhibitor is that the frost inhibitor is milled to be coarser than the powder mixture A. Foamed glass produced by using frost inhibitor having too fine particles includes crystals of wollastonite ($CaO \cdot SiO_2$) created by reaction with the frost inhibitor, and the wollastonite inhibits the glass to foam. In addition, a $SiO_2$ deficient glass phase having low $SiO_2$ concentration can be created around the crystal of wollastonite. This $SiO_2$ deficient glass phase is easily dissolved by water so as to form pores therein, thus increasing the water absorption of the foamed glass.

The powder mixture A including the glass cullet, the foaming agent and the crystallization inhibitor is mixed with the powdered frost inhibitor so as to prepare a powder raw material. The powder raw material may be press-molded by a mold.

To prevent a molded body from cracking when it is carried or fired, water and/or water glass may be added to the powder raw material to pelletize and the pellets may be loaded in the mold to form a molded body. It is preferable that more than 70% of the pellets have a diameter from 0.3 to 2 mm. The pellets having such diameter can be tightly loaded in the mold so as to form a molded body having high bulk density. A foamed glass produced by firing the molded body having high bulk density has low bulk density and low water absorption.

Use of pellets having diameter exceeding the aforementioned range produces a large volume of air gaps in the molded body. The air gaps produce continuous pores in the foamed glass after fired, and undesirably increases the water absorption of the foamed glass.

After loading the raw material composed of the powder and/or the pellets into the mold, the raw material in the mold may be pressed so as to provide high bulk density to the molded body. This high bulk density provides to low bulk density and low water absorption to the foamed glass as mentioned above.

In an embodiment of the present invention, the raw material is molded by a mold placed on a mesh belt. The molded body is released from the mold inside or outside a kiln. A parting agent may be previously applied to the mesh belt. The parting agent may be pulverized alumina, clay, bentonite, or mica.

The molded body is preferably fired at 700–800° C., more preferably at 710–770° C. The kiln may be a mesh belt kiln. The firing time is preferably from 10 to 60 minutes, more preferably from 15 to 30 minutes. Firing temperature or time lower and shorter than the aforementioned range makes the glass to foam insufficiently, so that the foamed glass has high bulk density. On the other hand, firing temperature or time exceeding the aforementioned range makes the glass foaming excessively, so that the foamed glass has continuous cells whereby increasing the water absorption thereof.

A foamed glass produced in this manner has preferably bulk density from 0.2 to 0.8.

The lightweight heat-insulating building material having frost resistance of the present invention may be composed of the aforementioned foamed glass only or may be composed of the foamed glass and compact non-foamed glass. For example, the building material may comprise the foamed glass layer and a compact glass layer laminated on at least a portion of surfaces of the foamed lass. The compact glass layer improves the appearance and water-proof property of the building material. The building material according to the present invention may be a laminated body comprising a foamed glass layer and another foamed glass layer which is made of waste glass including dust and is laminated on the foamed glass layer. A compact glass layer may be further formed on at least a portion of surfaces of the laminated body.

Function mechanism of exhibiting the excellent frost resistance in the foamed glass according to the present invention will be considered in detail as follows.

Conventional foamed glass having closed cells actually absorbs water little by little for a long period of time. As a result, the foamed glass is cracked due to the frost damage. This is because portions having thin cell walls (walls of cells formed in a foamed glass) and/or boundary faces between a glass phase and crystal phase may be dissolved by water so as to form pores through which water can easily enter into the glass. Although the conventional glass has low water absorption at an early stage of absorbing water due to insufficient replacement between gas or air in the cells and water, the conventional foamed glass has small pores which are already formed at cells during firing so that water is absorbed therethrough.

On the other hand, the foamed glass as building material according to the present invention has not only low ordinary water absorption, but also low boiled water absorption and low long-term water absorption because it contains the frost inhibitor. The frost inhibitor also increases the strength of the lightweight heat-insulating building material.

According to the present invention, the mixing ratios of the crystallization inhibitor and the frost inhibitor can be controlled in such a range allowing foaming at a low temperature. The foamed glass as building material of the present invention is fired at a temperature lower than the conventional foamed glass. The foamed glass of the present invention can be manufactured at a low cost without any special system in the mold or the kiln. The building material of the present invention can be made without necessity of foaming and firing for previously producing foamed beads. The building material of the present invention can be manufactured with a reduced number of steps and at low cost.

Hereinafter, examples and comparative examples will be described.

Raw materials used in the examples and the comparative examples are as follows:
<Glass>
 FL: waste glass of float plate glass
 BN: waste glass of glass bottles
<Foaming Agent>
 D: dolomite
 A: aluminium metal
<Crystallization Inhibitor>
 N: sodium silicate powder (No. 3) $Na_2O.3SiO_2$
 W: water glass (No. 3)
 B: absolute borax $Na_2B_4O_7$
<Frost inhibitor>
 L: ALC powder
 M: mortar board powder
 K: calcium silicate board powder
 S: asbestos powder

EXAMPLES 1–25

Comparative Examples 1–5

Respective foamed glass was manufactured with proportions of components of raw materials as shown in Table 1.

The glass, the foaming agent, and the crystallization inhibitor were milled and mixed in such a manner as to have powder of which 30 percent or more has grain size from 1 to 10 μm, and then added and mixed with the frost inhibitor which was previously milled in such a manner as to have powder of which 50 percent or more has grain size from 10 to 43 μm. 23% by weight water was added into the mixture and then pelletized by a pan-shaped pelletizer in such a manner as to have pellets of which 70 percent or more have diameter from 0.3 to 2 mm. In case of using water glass, the water glass was not added during milling and mixing step and was added instead of water during pelletizing step, as the next step of the milling and mixing step, so as to make pellets in the same manner. After the pelletizing step, the pellets were aged in the sealed state for 18 hours and then dried at 50° C. for 24 hours.

Obtained material pellets were then formed and fired as follows.

First, the material pellets were loaded on a shelf of 8 mm in thickness which is made of mullite cordierite and surrounded by a mold. A mesh belt of 1100×1400 mm was previously disposed on the shelf as a base sheet. The mesh belt was prepared by applying and drying slurry of pulverized alumina and mica.

The loaded material pellets were pressed from the above at pressure about 0.2 kg/cm$^2$ to eliminate irregularities nor gaps therein. After the pressing, the mold was released.

The pressed body was fired with a large-size electric furnace (kanthal furnace) by raising the temperature at a raising rate 7.5° C./min. and retaining the pressed body at the maximum temperature 750° C. (730° C. in case having the frost inhibitor mixed) for 30 minutes. After that, the temperature was cooled at a rate 1° C./min. The maximum temperature was selected to obtain most suitable bulk density and water absorption for every proportions of components based on pilot studies.

The bulk density of the fired body after firing was measured and the result is shown in Table 1. Comparative Examples 1, 3 containing no crystallization inhibitor nor frost inhibitor and Comparative Example 4 containing no frost inhibitor had low bulk density and were therefore considered as good foamed glass in appearance. On the other hand, Comparative Examples 2, 5 containing the frost inhibitor but no crystallization inhibitor were little foamed and were still in the fired state.

Then, obtained fired bodies were cut and grinded both surfaces thereof to get specimens for evaluation. The flexural strength, the ordinary water absorption, the boiled water absorption, and the freezing and thawing endurance (frost resistance) were measured in the following methods for every specimens and the results are shown in Table 1.
<Flexural Strength>
 The measurement was conducted at a loading speed (cross head speed) 2 mm/min. by using an Auto Graph manufactured by Simadzu Corp.
<Ordinary Water Absorption>
 Variations in weight of each specimen was measured after immersed at water depth 300 mm for 48 hours.
<Boiled Water Absorption>
 Each specimen was immersed in cold water and the water was boiled. The specimen was immersed for 3 hours after boiled and was then cooled for one night. At this point, variations in weight of the specimen was measured.
<Freezing and Thawing Endurance>
 The measurement was conducted by using a frost resistance tester manufactured by Marui Corporation in accordance with JIS A 5422. The measurement conditions are as follows: the dimension of specimens is 100×200 mm; and one frost-defrost cycle for 3 hours comprises freezing in air at −20° C. and thawing in water at +20° C. The specimens were sometimes observed to record the number of cycles at which each specimen is broken. The cycle was stopped at the 600th cycle. Examples broken after 300 cycles were evaluated as "very good" examples broken after 250 cycles before 300 cycles were evaluated as "good", and examples broken before 250 cycles were evaluated as "bad".

TABLE 1

| | | Composition of Raw Materials (Balance = Glass) | | | | | | | Firing Temperature (°C.) | Bulk Density (g/cm³) | Flexural Strength (MPa) | Ordinary Water Absorption (% by weight) | Boiled Water Absorption (% by weight) | Freezing/Thawing Endurance | |
|---|---|---|---|---|---|---|---|---|---|---|---|---|---|---|---|
| | | Kind of Glass | Foaming Agent | | Crystallization Inhibitor | | Frost Inhibitor | | | | | | | Cycle | Evaluation |
| | | | Kind | Mixing Ratio (% by weight) | Kind | Mixing Ratio (% by weight) | Kind | Mixing Ratio (% by weight) | | | | | | | |
| Comparative Example | 1 | FL | D | 2 | — | 0 | — | 0 | 730 | 0.28 | 2.0 | 11 | 159 | 72 | bad |
| | 2 | FL | D | 2 | — | 0 | L | 3 | 750 | 0.83 | 7.5 | 5 | 92 | 96 | bad |
| Example | 1 | FL | D | 2 | N | 5 | L | 3 | 750 | 0.37 | 3.7 | 8 | 30 | 600 | very good |
| | 2 | FL | D | 2 | N | 5 | L | 7 | 750 | 0.42 | 4.2 | 12 | 33 | 600 | very good |
| | 3 | FL | D | 2 | N | 5 | M | 5 | 750 | 0.41 | 4.0 | 6 | 32 | 600 | very good |
| | 4 | FL | D | 2 | N | 5 | M | 10 | 750 | 0.49 | 5.0 | 11 | 44 | 600 | very good |
| | 5 | FL | D | 2 | N | 5 | K | 5 | 750 | 0.35 | 3.4 | 13 | 52 | 600 | very good |
| | 6 | FL | D | 2 | N | 5 | K | 10 | 750 | 0.40 | 3.7 | 10 | 48 | 600 | very good |
| | 7 | FL | D | 2 | N | 5 | S | 3 | 750 | 0.39 | 4.0 | 7 | 29 | 600 | very good |
| | 8 | FL | D | 2 | N | 5 | S | 7 | 750 | 0.45 | 4.5 | 5 | 38 | 600 | very good |
| | 9 | FL | D | 2 | W | 10 | L | 7 | 750 | 0.39 | 3.8 | 14 | 43 | 600 | very good |
| | 10 | FL | D | 2 | B | 3 | L | 7 | 750 | 0.45 | 3.8 | 9 | 40 | 396 | very good |
| | 11 | BN | D | 2 | N | 5 | L | 7 | 750 | 0.40 | 3.5 | 11 | 40 | 600 | very good |
| | 12 | FL | D | 2 | N | 5 | S | 3 | 750 | 0.36 | 3.3 | 9 | 45 | 600 | very good |
| Comparative Example | 3 | FL | D | 4 | — | 0 | — | 0 | 730 | 0.25 | 1.7 | 15 | 218 | 24 | bad |
| | 4 | FL | D | 4 | W | 10 | — | 0 | 730 | 0.21 | 1.5 | 7 | 58 | 72 | bad |
| | 5 | FL | D | 4 | — | 0 | L | 3 | 750 | 0.70 | 7.0 | 6 | 81 | 120 | bad |
| Example | 13 | FL | D | 4 | N | 5 | L | 3 | 750 | 0.32 | 3.1 | 7 | 30 | 600 | very good |
| | 14 | FL | D | 4 | N | 5 | L | 7 | 750 | 0.38 | 3.8 | 9 | 24 | 600 | very good |
| | 15 | FL | D | 4 | N | 5 | M | 5 | 750 | 0.36 | 3.5 | 7 | 36 | 600 | very good |
| | 16 | FL | D | 4 | N | 5 | M | 10 | 750 | 0.41 | 4.1 | 11 | 39 | 600 | very good |
| | 17 | FL | D | 4 | N | 5 | K | 5 | 750 | 0.30 | 2.9 | 14 | 33 | 600 | very good |
| | 18 | FL | D | 4 | N | 5 | K | 10 | 750 | 0.35 | 3.4 | 10 | 38 | 600 | very good |
| | 19 | FL | D | 4 | N | 5 | S | 3 | 750 | 0.33 | 3.2 | 8 | 29 | 600 | very good |
| | 20 | FL | D | 4 | N | 5 | S | 7 | 750 | 0.40 | 3.9 | 7 | 37 | 600 | very good |
| | 21 | FL | D | 4 | W | 10 | L | 7 | 750 | 0.36 | 3.2 | 7 | 47 | 600 | very good |
| | 22 | FL | D | 4 | B | 3 | L | 7 | 750 | 0.42 | 3.4 | 15 | 48 | 258 | good |
| | 23 | BN | D | 4 | N | 5 | L | 7 | 750 | 0.37 | 3.3 | 13 | 42 | 600 | very good |
| | 24 | BN | D | 4 | N | 5 | S | 3 | 750 | 0.33 | 3.0 | 10 | 46 | 600 | very good |
| | 25 | FL | A | 0.5 | N | 5 | L | 7 | 750 | 0.46 | 3.9 | 8 | 37 | 600 | very good |

FL: waste glass of float plate glass
BN: waste glass of glass bottles
N: sodium silicate powder (No. 3) $Na_2O \cdot 3SiO_2$
W: water glass (No. 3)
B: absolute borax $Na_2B_4O_7$
D: dolomite
A: aluminium metal
L: ALC powder
M: mortar board powder
K: calcium silicate board powder
S: asbestos powder Products of the present invention containing both the crystallization inhibitor and the frost inhibitor as additives are slightly inferior in bulk density to products without containing these additives, but are excellent in flexural strength as compared to the proportional equation of density-flexural strength of the products without containing these additives.

There is no significant difference in the ordinary water absorption among the products, although there is significant differences in the boiled water absorption among them. That is, the products without crystallization inhibitor and frost inhibitor have 100% or more of boiled water absorption while the products of the present invention have 50% or less of boiled water absorption and therefore have excellent freezing and thawing endurance.

What is claimed is:

1. A lightweight heat-insulating building material having frost resistance comprising: a mixture of raw materials containing glass powder, 0.3–10 wt % carbonate or 0.1 to 5 wt % aluminum metal as a foaming agent, 1–10 wt %, expressed as sodium silicate, of a crystallization inhibitor of at least one material selected from the group consisting of boric acid, borax and $Na_2SO_4 \cdot 10H_2O$, and 0.5–30 wt % of a frost inhibitor containing calcium silicate, said mixture being molded and fired to form a molded body.

2. A lightweight heat-insulating building material having frost resistance according to claim 1, wherein said frost inhibitor is construction and demolition waste of calcium silicate.

3. A lightweight heat-insulating building material having frost resistance according to claim 1, wherein said frost inhibitor is at least one selected from the group consisting of lightweight aerated concrete, mortar, concrete, cement, calcium silicate plate, asbestos cement plate, wollastonite, and asbestos.

4. A lightweight heat-insulating building material having frost resistance according to claim 1, wherein the foaming agent is 0.3 to 10% by weight carbonate.

5. A lightweight heat-insulating building material having frost resistance according to claim 1, wherein the mixture of raw materials contains, as the foaming agent, 0.5 to 5% by weight carbonate and 0.3 to 1% by weight aluminium metal.

6. A lightweight heat-insulating building material having frost resistance according to claim 5, wherein a total of the carbonate and the aluminium metal is 1 to 5% by weight.

7. A lightweight heat-insulating building material having frost resistance according to claim 1, wherein the carbonate is at least one of dolomite and calcium carbonate.

8. A lightweight heat-insulating building material having frost resistance according to claim 1, wherein the carbonate is dolomite.

9. A lightweight heat-insulating building material having frost resistance according to claim 1, wherein the molded body is fired at a temperature from 700 to 800° C.

* * * * *